United States Patent
Reinthaler et al.

(10) Patent No.: US 10,053,304 B2
(45) Date of Patent: Aug. 21, 2018

(54) HOLDER

(71) Applicants: B&R INDUSTRIAL AUTOMATION GMBH, Eggelsberg (AT); KRONES AG, Neutraubling (DE)

(72) Inventors: Michael Reinthaler, Pfaffstaett (AT); Martin Hoeck, Ostermiething (AT); Konrad Senn, Alteglofsheim (DE); Michael Neubauer, Grassau (DE); Stefan Elsperger, Soechtenau (DE)

(73) Assignees: B&R INDUSTRIAL AUTOMATION GMBH, Eggelsberg (AT); Krones AG, Neutraubling (DE)

( * ) Notice: Subject to any disclaimer, the term of this patent is extended or adjusted under 35 U.S.C. 154(b) by 0 days.

(21) Appl. No.: 15/221,093

(22) Filed: Jul. 27, 2016

(65) Prior Publication Data
US 2017/0029223 A1 Feb. 2, 2017

(30) Foreign Application Priority Data

Jul. 28, 2015 (AT) .............................. A 50677/2015

(51) Int. Cl.
| | |
|---|---|
| *B65G 15/60* | (2006.01) |
| *B65G 54/02* | (2006.01) |
| *F16B 17/00* | (2006.01) |
| *H02K 41/03* | (2006.01) |

(52) U.S. Cl.
CPC .............. *B65G 54/02* (2013.01); *F16B 17/00* (2013.01); *H02K 41/031* (2013.01)

(58) Field of Classification Search
USPC ................................................ 198/619, 805
See application file for complete search history.

(56) References Cited

U.S. PATENT DOCUMENTS

| | | | |
|---|---|---|---|
| 5,316,228 A | * | 5/1994 | Santandrea .......... H02K 15/095 |
| | | | 242/432.4 |
| 6,769,553 B1 | | 8/2004 | Hurt |

(Continued)

FOREIGN PATENT DOCUMENTS

| | | |
|---|---|---|
| DE | 10 318 411 | 11/2003 |
| DE | 10 2004 012 049 | 10/2005 |

(Continued)

OTHER PUBLICATIONS

Austrian Search Report conducted in counterpart Austrian Appln. No. A 50677/2015 (dated Jul. 26, 2016).

(Continued)

*Primary Examiner* — Gene O Crawford
*Assistant Examiner* — Lester Ill Rushin
(74) *Attorney, Agent, or Firm* — Greenblum & Bernstein, P.L.C.

(57) ABSTRACT

A holder (10) for use in a conveyor line (20) formed from a stator of a long stator linear motor with at least a first retaining element (1) and a second retaining element (2), wherein the first retaining element (1) and the second retaining element (2) are arranged side by side and spaced apart from each other in a first direction (3) and the first retaining element (1) in this first direction (3) comprises a first rigidity (S1) and the second retaining element (2) in this first direction (3) a second rigidity (S2), which is lower than the first rigidity (S1).

20 Claims, 2 Drawing Sheets

(56) References Cited

U.S. PATENT DOCUMENTS

| | | | |
|---|---|---|---|
| 7,293,950 B2* | 11/2007 | Bonora | ............ H01L 21/67766 |
| | | | 104/282 |
| 9,546,053 B2* | 1/2017 | Hanisch | ............... B65G 54/025 |
| 2003/0197432 A1 | 10/2003 | Hashimoto et al. | |
| 2005/0198801 A1 | 9/2005 | Schmid | |
| 2006/0016366 A1 | 1/2006 | Feix et al. | |
| 2009/0178772 A1 | 7/2009 | Birkkjaer | |
| 2012/0080301 A1 | 1/2012 | Birkkjaer | |
| 2014/0377096 A1* | 12/2014 | Yano | ....................... F04D 25/06 |
| | | | 417/411 |

FOREIGN PATENT DOCUMENTS

| | | |
|---|---|---|
| JP | S63-191876 | 12/1988 |
| JP | H04-248341 | 9/1992 |

OTHER PUBLICATIONS

European Office Action/Search Report conducted in counterpart European Appln. No. EP 16 18 1382 (dated Mar. 10, 2017) (w/ Machine translation).

* cited by examiner

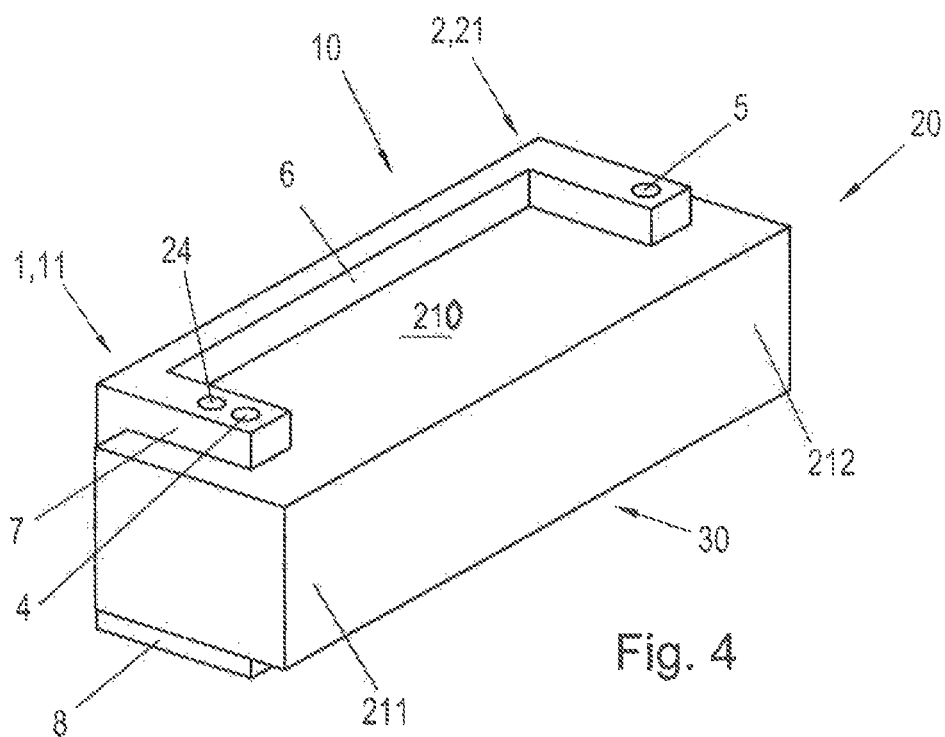
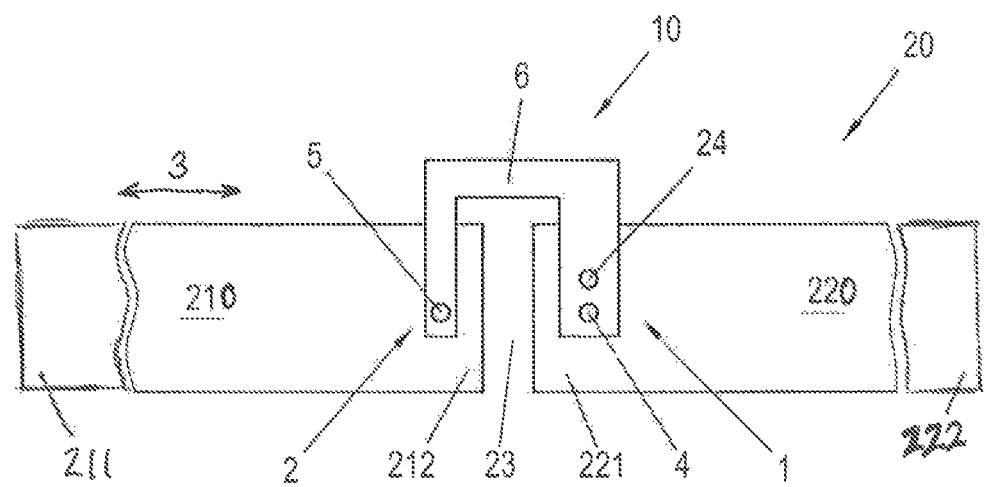

HOLDER

CROSS-REFERENCE TO RELATED APPLICATIONS

This application claims priority under 35 U.S.C. § 119(a) of Austrian Application No. A 50677/2015 filed Jul. 28, 2015, the disclosure of which is expressly incorporated by reference in its entirety.

DISCUSSION OF BACKGROUND INFORMATION

1. Field of the Invention

The present invention is concerned with a holder for a component and a conveyor line in which the holder is used.

2. Description of Related Art

In particular in the production technology, the material handling or transportation of goods is of particular importance. For transportation of various goods, products, components and the like, a wide range of conveyor systems are being used. One of the best known transportation facilities in the material handling is the so-called continuous conveyor, of which the belt conveyor is the most common representative. This is well-known in a wide range of variants. The components mentioned above are positioned at regular or irregular intervals on a so-called belt or a band. The drive of the belt, on which subsequently several of the components are placed, is usually driven via a central drive unit. Although this allows a continuous conveying of the different components, all components inevitably move with a common, same speed, which corresponds to the speed of the belt or the band.

Especially modern or complex logistics and conveyor systems often require that different components with different transport speeds must be conveyed on the same transportation facility. For example, a separation process may bring about such a requirement. In order to close any gaps in the product flow caused by the separation, the components must be appropriately accelerated or delayed, or at least moved at different speeds. In this context, particularly long stator linear motors, often referred to as LLM, are being used advantageously to implement a corresponding conveyor line.

The stator of a long stator linear motor is formed by a certain number of electric driver coils. Their concatenation results in a corresponding conveyor line. The previously mentioned components are arranged on mobile transportation units which comprise excitation magnets. In a manner known per se, these excitation magnets can be designed as permanent magnets or in the form of electric coils, hence as electromagnets.

The driver coils of the stator are often controlled individually, resulting in the control of a moving magnetic field. The individual transportation units are thereby put in motion along the conveyor line, depending on which driver coils are controlled. Due to the fact that the driver coils are controlled independently of one another, also several transportation units on a conveyor line can be moved independently of one another. Moreover, using the corresponding control, these can be moved or accelerated or delayed at different speeds of transport. This allows an optimal adaptation to the requirements of a logistics system and thus bring related economic benefits. Existing facilities, for example for further processing of components, can be optimally exploited because the transportation facility can transport or deliver different components at the best possible cycle time and thus optimize the product flow. The low number of wear parts of a long stator linear motor reduces maintenance costs, or individual transportation units can be replaced easily without major expenditure.

If the driver coils of the stator are carrying current, this results in a corresponding heating of the stator. Because the stator is held or positioned in a holder, the heating and the associated expansion of the stator causes mechanical stresses in the stator. This can in turn lead to correspondingly unwanted or uncontrolled deformations. Required position or form tolerances cannot be maintained in a comprehensible manner.

SUMMARY OF THE EMBODIMENTS

The problem addressed by the invention consists of providing a holder for carrying, affixing and/or positioning a component, in particular of a stator element of a stator of a long stator linear motor, by which mechanical tension in the component due to thermal expansion preferably can be prevented or at least reduced.

The problem is solved in that the holder comprises at least a first retaining element and a second retaining element. Thereby the first retaining element and the second retaining element are arranged side by side and in a first direction spaced apart from each other. The first retaining element comprises in this first direction a first rigidity, and the second retaining element comprises in this first direction a second rigidity which is less than the first rigidity. In the intended use this holder holds a component. If the same force acts on the two retaining elements of the holder, for example due the expansion as result of the heating of the held component, a deformation occurs particularly in the second retaining element, whereby the mechanical tension in the component is at least reduced. Due to the different rigidities, deformations primarily occur in the second retaining element. In this way, tensions are specifically reduced in the area of the second retaining element.

An advantageous embodiment provides that each retaining element has a first end, which in the intended use of the holder is arranged stationary and immobile, and a second end, which is movable at least in the first direction. This allows an installation, for example, on a wall or other stationary structure, wherein the movement of a retaining element in consequence of the aforementioned deformation is limited to the end of a retaining element facing away from the fixed structure.

An advantageous variant provides that a retaining element is U-shaped with a base arranged at the first end and two protruding arms therefrom, wherein at least one arm comprises the first rigidity or the second rigidity. Such a U-shaped bridge is particularly advantageous for the holding of a component because the form allows a gripping or embracing of a component to be held, wherein this can be particularly well guided or supported.

Advantageously it is provided that one arm in a second direction comprises normally in the first direction an additional lower rigidity than the other arm. This allows a defined deformation in another direction. Possibly occurring tensions in a component can be specifically reduced by specifically allowing a deformation.

Thereby it is advantageously provided that the arm with the additional lower rigidity in the second direction is divided in the second direction. Through the corresponding division, for example by a slot, the rigidity can be controlled selectively depending on the requirements. Further, the division provides the possibility to limit a possibly occurring deformation to only a section of an arm of the retaining element.

An advantageous embodiment provides that the first retaining element is connected with the second retaining element at their first ends. The result is a better manageability of the holder since it is only formed by a common device and no differently designed components must be observed. Even with the stationary installation the connection provides advantages through simplified handling.

In its intended use the holder is used for a conveyor line. The conveyor line is built from at least a first stator element and at least a second stator element of a stator of a long stator linear motor and at least an aforementioned holder. Thereby, the first and the second stator element in the aforementioned first direction are spaced apart from each other. The first stator element and the second stator element each comprise a first stator element end and a second stator element end, wherein a first stator element end is connected with the first retaining element of the holder and a second stator element end with the second retaining element of the holder. If, in the course of the operation of the conveyor line or the long stator linear motor a stator element heats up, this can be deformed in a defined direction by the lower rigidity of the second retaining element. The first retaining element, however, with its higher rigidity ensures the positioning of the stator element.

Advantageously, the first stator element end of a stator element is attached to the first retaining element of the holder and the second stator element end of the same stator element to the second retaining element of the holder. A stator element is thus held by a holder, wherein a stator element end is held by a retaining element with higher rigidity and the other stator element end by a retaining element with lower rigidity. The two retaining elements are thus associated with one and the same holder. It is advantageously provided that the first stator element and the second stator element are directly adjacent. The distance between two stator elements is thus kept as low as possible and allows a movement as uniform as possible.

Thereby it is advantageously provided that the first stator element end of the second stator element is connected with the first retaining element of the holder and the second stator element end of the first stator element is connected with the second retaining element of the holder. In this way, the holder is only located in that area in which two stator element ends are opposite to each other. The holder can thus be kept as compact as possible. Since the longitudinal extension of the stator elements has thus no influence on the holder, a holder can thus be used for stator elements with different longitudinal extension or shaping such as curves.

Advantageously, the previously described U-shaped design variant of a retaining element is used, wherein the U-shaped bridge between the arms protruding from the base comprise an inner area and the at least one first stator element and/or the at least one second stator element is arranged at least partially within the inner area. This design variant ensures that the relevant stator element is optimally supported.

It is advantageously provided that the conveyor line comprises a guide system for the guiding of a transportation facility. For this purpose, a mounting option in form of at least one holder bore for the guide system is provided on the first retaining element on which the guide system is attached. In this way, the first retaining element is used as support of a guide system such as a rail system. However, since in the case of the deforming of a stator element primarily the second retaining element compensates the deformation due to its lower rigidity, the guide system is not affected by the deformation of the stator element due to its arrangement on the first retaining element.

BRIEF DESCRIPTION OF DRAWINGS

The present invention is explained in more detail below with reference to the FIGS. 1 to 5 which show exemplary, schematic and not limiting advantageous embodiments of the invention. In the course of this

FIG. 4 the holder in connection with a stator element of a conveyor line,

FIG. 5 the use of the holder in one particularly advantageous embodiment in a conveyor line.

DETAILED DESCRIPTION OF THE EMBODIMENTS

Figure 1:
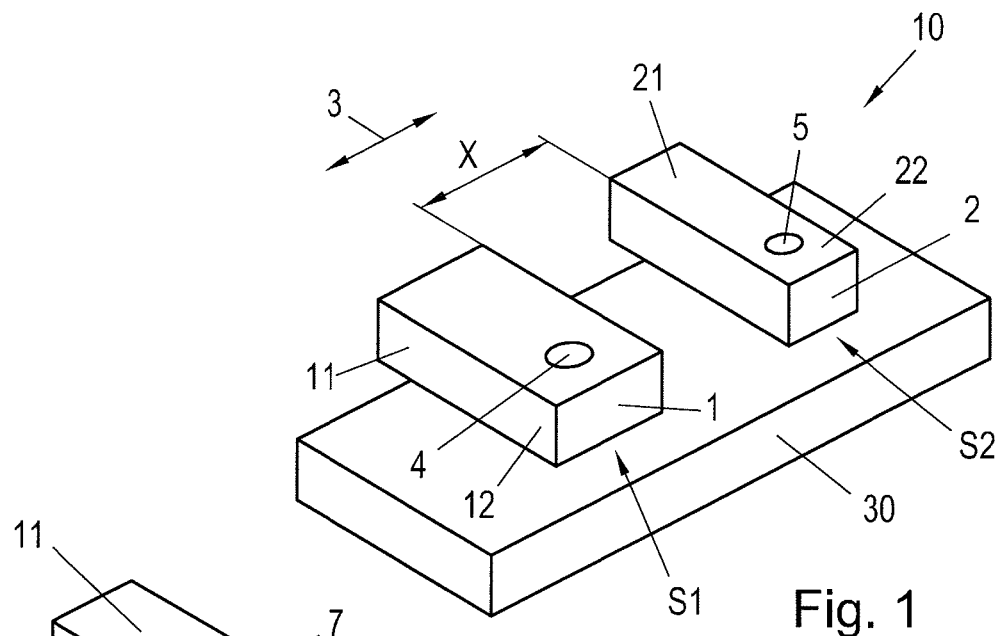
FIG. 1 shows a first and a second retaining element of a holder according to the present invention, FIG. 2 the holder in an advantageous embodiment, FIG. 3 a further advantageous embodiment according to view III in FIG. 2

The holder 10 according to the present invention comprises according to FIG. 1 at least one first retaining element 1 and a second retaining element 2. Thereby the first retaining element 1 and the second retaining element 2 are arranged side by side and in a first direction 3 spaced apart from each other, as shown by double arrow in FIG. 1. The first retaining element 1 comprises in this first direction 3 a first rigidity S1 and the second retaining element 2 in this first direction 3 a second rigidity S2. Here, it must be noted that the second rigidity S2 of the second retaining element 2 according to the present invention is lower than the first rigidity S1 of the first retaining element 1.

In the intended use this holder 10 holds a component 30. E.g. by attaching a component 30 to the holder 10. For example, a heating of the held component 30 can occur, which inevitably results in a more or less pronounced expansion of the component 30. More or less pronounced because the effect of the expansion, in a comprehensible manner, is most significant in the longest extension of the component 30. Through the heating mentioned as an example, wherein the action of other external forces is not excluded, a corresponding force acts on both retaining elements 1 and 2 of the holder 10. In that the first retaining element 1 comprises a higher rigidity S1 than the second retaining element 2, a deformation in the first direction 3 rather occurs on the second retaining element 2 than on the first retaining element 1. Through the corresponding deformation of the retaining elements 1 and 2, the component 30 that is heating up is given the opportunity to at least reduce mechanical tension by a targeted expansion. Here, it must be noted that a distance X in the first direction 3 between the first retaining element 1 and the second retaining element 2, as shown in FIG. 1, must be selected so that during a maximum expected expansion of the aforementioned component 30 it does not come to a contact between the first and the second retaining elements 1 and 2. Otherwise, it would lead to early obstruction of the movement just described.

As can be seen further in FIG. 1, each of the at least two retaining elements 1 and 2 comprises a first end 11 or 21, which is arranged stationary in the intended use of the holder. Furthermore, the first retaining element 1 comprises a second end 12 or the second retaining element 2 also comprises a second end 22, wherein the second ends 12 and 22 are movable in at least the first direction 3.

It is provided that in the intended use the first end 11 or 21 are attached, for example, on a wall or other stationary structure. For the mounting for example, not further shown in FIG. 1, bores or a screw connection can be considered. Of course, other joining techniques such as welding, gluing and the like are quite possible. In this way, both the first retaining element 2 and the second retaining element 2 are arranged stationary and immobile by their respective first ends 11 and 21. Thereby, the movement of a retaining element land 2, as a result of the aforementioned deformation, is limited to the second ends 12 and 22 facing away from the stationary structure of the respective retaining element 1 and 2.

According to the invention, an aforementioned component 30 is preferably attached to the second ends 12 and 22 of the respective retaining element 1 and 2. Merely serving as an example, and in no way limiting, the holder bores 4 and 5 in FIG. 1 are illustrated on the respective ends 12 and 22. If there is a previously described force transmission to the retaining elements 1 and 2, deformation primarily occurs on the second retaining element 2 due to the lower rigidity S2 in at least the first direction 3. In this way, the mechanical tension can be reduced in the component 30. Due to the higher rigidity S1 of the first retaining element 1, this remains undeformed or in comparison with the second retaining element 2 deforms only slightly, and the held component 30 remains in a defined position despite its deformation.

In relation to the two retaining elements 1 and 2, for example, it can be provided that both the first retaining element 1 and the second retaining element 2 are made of the same material. As is shown only schematically in FIG. 1, in this case, the lower rigidity S2 of the second retaining element 2 is for example achieved in that a different dimensioning is chosen for the second retaining element 2 than for the first retaining element 1.

Although FIG. 1 shows in the second retaining element 2 a consistently lower cross-section compared to the cross-section of the first retaining element 1, this is to be seen merely as an example. Of course, the first retaining element 1 and/or the second retaining element 2 do not have to comprise a continuously constant cross-section. For example, the lower rigidity S2 for the second retaining element 2 can also be realized by a local reduction of the cross section, such as a constriction or cross-sectional reduction at a suitable location. Also another different shaping of the two retaining elements 1 and 2 can of course be considered as long as the aforementioned interaction of the two rigidnesses S1 and S2 are given.

Of course, the two retaining elements 1 and 2 can also be made of different materials. The choice of the material needs to be made so that in case of the same cross-section of the two retaining elements 1 and 2 it gives according to the invention a higher rigidity S1 for the first retaining element 1 than for the second retaining element 2. It is known that the selection of a suitable material aside from the aforementioned required different rigidnesses S1 and S2 also incorporates resistance to environmental influences, fatigue strength, thermal conductivity, electrical insulating properties and the like. A listing of different, suitable materials is not made at this point, since the appropriate choice of material is at the discretion of the person skilled in the art, and can be made without further ado. Since the advantages of the holder 10 according to the invention are most significant in the deformation due to the heating up of a component 30, it is of course advantageous to make sure that good dissipation of the resulting heat is possible. For this reason, materials with a particularly high thermal conductivity, such as metals, are to be preferred when implementing the holder 10 according to the invention.

Also it should be noted that the roughly rectangular cross-section of the first retaining element 1 and of the second retaining element 2 selected in FIG. 1 is only an example. On one hand a rectangular cross section is not necessary, on the other hand, the first retaining element 1 and the second retaining element 2 do not necessarily have to comprise the same cross-section geometry.

Figure 2:
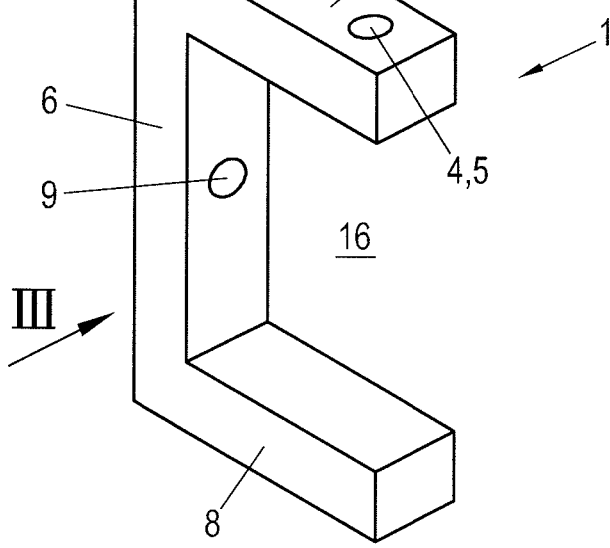

FIG. 2 shows an advantageous embodiment of a retaining element 1 and/or 2. Thereby, the respective retaining element 1, 2 is shown in a U-shaped embodiment. On the first end 11 a base 6 is arranged. By means of the protruding arms 7 and 8 ultimately the U-shape is formed. Thereby, at least one of the two arms of 7 and/or 8 comprises the first rigidity S1 or the second rigidity S2.

An inner area 16 is formed between the two arms 7 and 8. A corresponding component 30, which is held by the holder 10, thereby can at least partially be arranged in the inner area 16 of the U-shaped holder 10. Such a U-shaped holder 10 is particularly advantageous for the holding or fastening of an aforementioned component 30 because the form allows a gripping or embracing of the component 30, wherein this can be particularly well guided or supported. The holder bores 4, 5 already mentioned in connection with FIG. 1 serve as an example for the attachment of the component 30. For the attachment of the first end 11 or the base 6, as previously mentioned and merely as an example, a bore 9 is provided. This allows, for example, the installation on the wall or other stationary structure using screw connection, wherein other installation variants can also be provided.

Of course, such a U-shaped embodiment can be provided for both the first retaining element 1 and the second retaining element 2 as well as for only one of the two retaining elements 1 or 2.

Figure 3:
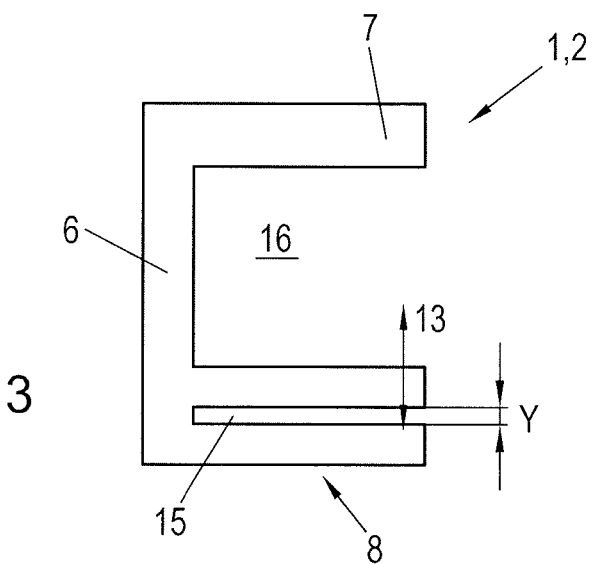

FIG. 3 shows a particularly advantageous variant, in connection with the U-shaped embodiment of a retaining element 1 and/or 2, with a view selected from the direction of the arrow III in FIG. 2.

As already mentioned, the effect of the expansion through the heating up of the held component 30 is inevitably most significant in the longest extension of the component 30. If one of the two arms 7 or 8 in a second direction 13, which normally stands in the first direction 3, comprises an additional, lower rigidity S3 than the other arm 7 or 8 in the second direction 13, changes in length can be allowed defined in this second direction 13. This additional, lower rigidity S3 in the second direction 13 can based on its value be in the range of the second rigidity S2 in first direction 3 of the second retaining element 2. In turn, possibly occurring tensions in a component 30 can be specifically reduced in that a deformation in a second direction 13 is specifically allowed, which is illustrated in the form of a double arrow in FIG. 3.

As already described for the two retaining elements 1 and 2, the additional, lower rigidity S3, for example, can be accomplished by the dimensioning of the cross-section of the respective arm 7 or 8. In an especially advantageous manner, however, that arm 7 or 8 with a lower rigidity S3 in the second direction 13 is divided in the second direction 13. With the corresponding division, as shown in FIG. 3, for example, through a gap 15 with the width Y, the additional, lower rigidity S3 can be specifically controlled according to the requirements. Such a gap 15 in arms 7 or 8 of a U-shaped retaining element 1 and/or 2 can for example also be introduced later and does therefore not have to be considered in the first production steps yet.

If, for example, a heating up of the component 30 occurs, a deformation also in a second direction 13 is permitted. As shown in FIG. 3, the gap 15 changes accordingly, which results in the division of the corresponding arm or 8, if the component 30 correspondingly deforms in the second direction 13.

As noted in connection with the distance X between first and second retaining element 1 and 2 shown in FIG. 1, it also applies to the gap 15 that its width Y in the second direction 13 is to be designed according to a maximum expected deformation.

FIG. 4 shows the holder 10 in its intended application and in a particularly advantageous embodiment. Here, a section of a conveyor line 20 of a long stator linear motor is shown schematically. The conveyor line 20 in FIG. 4 is formed by at least a first stator element 21 and at least a further second stator element 220, not further illustrated in FIG. 4, of a stator of a long stator linear motor and at least a holder 10 already described. Within a conveyor line 20, see. e.g., FIG. 5, the first stator element 210 and the second stator element 220 in the first direction 3 are arranged separately spaced from each other. Between the two stator elements 210 and 220 is the surrounding medium, such as air. The first stator element 210 and the second stator element 220 comprise each a first stator element end 211, 221 and a second stator element end 212, 222. Thereby, a first stator element end 211, 221 is always connected with the retaining element 1 of holder 10 and a second stator element end 212, 222 with the second retaining element 2 of the holder 10.

In particular on the stator of a long stator linear motor a corresponding heating up occurs during operation as a result of the current flow in the individual coils. The holder 10 already described in detail is applied in an especially advantageous manner by a conveyor line, which is formed by a stator of a long stator linear motor.

If in the course of the operation heating up of a stator element 210, 220 occurs, as a result of the lower rigidity S2 of the second retaining element 2 it can deform in a defined direction, or at least in the first direction 3. The first retaining element 1, however, with its higher rigidity S1 ensures the positioning of the respective stator element 210, 220.

In the variant shown in FIG. 4, for example, with a first stator element 210 the first stator element end 211 is attached on the first retaining element 1 of a holder 10 and the second stator element end 212 on the second retaining element 2 of the same holder 10. In this way, each stator element 210, 220 is assigned its own holder 10. It, however, must be noted that for different design variants of the stator elements 210, 220 also different variants of holders 10 must be provided. Under different design variants of the stator elements 210, 220, for example, different lengths or different radii of curvature (in case of curved sections) are to be understood.

FIG. 4 further shows a particularly advantageous embodiment of the holder 10, because the first retaining element 1 is connected with the second retaining element 2 on their first ends 11, 21. The U-shaped design variant of the holder is shown as an example, wherein in the case shown both the first retaining element 1 and the second retaining element 2 are formed U-shaped. Again, the connection in this case is merely shown as an example in form of base 6 commonly used by both retaining elements 1 and 2. This results in a one-piece embodiment of the holder 10. This in turn results in a better manageability of the holder 10 since it is formed by a common device only and no differently designed components in the form of the first retaining element 1 and second retaining element 2 must be observed. Even with the stationary installation the connection provides advantages through simplified handling. Of course, the connection of the first retaining element 1 and second retaining element 2 can also occur by a screwed frame at their first ends 11 and 21 or a different connection.

If the holder 10 for both retaining elements 1 and 2, as already described, is arranged. U-shaped, as also already described, an inner area 16 results between the arms 7 and 8 protruding from the base 6. In this case, at least a first stator element 210 and/or at least a second stator element 220 is arranged at least partly within the inner area 16, as can also be recognized for the first stator element 210 in FIG. 4.

Furthermore, it can be advantageously provided that the conveyor line 20 comprises a guide system for the guiding of a transportation facility of the long stator linear motor. To be able to attach the guide system, which is not further illustrated in the Figures, to holder 10, for example in the form of rails, advantageously a fixing possibility for the guide system in the form of a holder bore 24 is provided on the first retaining element 1 on which the guide system is attached. By mounting on the first retaining element 1, the guide system with a deformation of the second retaining element 2, for example, as a result of thermal expansion of the attached first and/or second stator elements 210, 220 remains unaffected thereof. Of course also other fastening options such as clamping systems or the like can be applied.

FIG. 5 shows another variant of the holder 10 according to the invention in its intended use. FIG. 5 shows also a section of the conveyor line 20 already described. Contrary to the representation selected in FIG. 4, both stator elements 210 and 220 however are schematically represented as components 30. Thereby, the first stator element 210 and the second stator element 220 are arranged immediately adjacent to each other.

According to the invention "arranged immediately adjacent" is to be understood to mean that between the first stator element 210 and the second stator element 220 no further part is arranged. Here it is however to be taken into account that the first stator element 210 and the second stator element 220 do not touch each other. Between the first stator element 210 and second stator element 220 therefore there is merely a gap 23 extending in the first direction 3. This gap 23 allows a corresponding expansion of the respective stator element 210, 22, when this, as already described, expands in the first direction 3. Depending on the length, shape, cross-section of the stator elements 210, 220, the width of the gap 23 in the first direction can be selected accordingly.

In case of the variant shown in FIG. 5, the first stator element end 221 of the second stator element 220 is connected with the first retaining element 1 of the holder 10, and the second stator element end 212 of the first stator element 210 with the second retaining element 2 of the holder 10. As can be seen in FIG. 5, this results in an extremely compact design. This leads to reduced material costs and simpler storage. However, the primary advantage is that for different lengths or forms of the individual stator elements 210, 220, no different holders 10 have to be provided. With this variant, it is irrelevant for the holder 10, whether for example individual stator elements 210, 220 are to be connected to each other, which comprise a certain radius, for example, to implement a curve in the conveyor line 20. Different embodiments of the holder 10, as required by a variant shown in FIG. 4, are not necessary in this case.

The holder 10 according to the invention allows a component 30, in particular to hold or attach to a stationary structure a first and/or second stator element 210, 220 of a stator of a long stator linear motor. Through the embodiment of the holder according to the invention mechanical tensions, particularly those that occur as a result of the heating up of the component 30, are preferably prevented or at least reduced.

What is claimed:

1. A holder comprising:
   at least a first retaining element; and
   at least a second retaining element,
   wherein the first retaining element and the second retaining element are arranged side by side and spaced apart from each other in a first direction, and
   wherein the first retaining element comprises a first rigidity and the second retaining element comprises a second rigidity, which is lower than the first rigidity, and
   wherein the first retaining element comprises a holder bore via which the first retaining element is attached to a guide system.

2. The holder according to claim 1, wherein the first and second retaining elements each comprise a first end, which is structured and arranged to be stationary and immobile, and a second end, which is structured to be movable at least in the first direction.

3. The holder according to claim 2, wherein at least one of the first and second retaining elements is U-shaped with a base arranged at the first end two arms protruding from the base, wherein at least one of the two arms comprises the first rigidity or the second rigidity.

4. The holder according to claim 3, wherein one of the two arms comprises, in a second direction normal to the first direction, an additional lower rigidity than the other of the two arms.

5. The holder according to claim 4, wherein the arm with the additional lower rigidity in the second direction is divided in the second direction.

6. The holder according to claim 2, wherein the first retaining element is connected to the second retaining element on their first ends.

7. A conveyor line comprising:
   the holder according to claim 1; and
   a guide system to guide a transportation facility,
   wherein the holder bore is attached to the guide system.

8. The conveyor line according to claim 7, wherein the first retaining element and the second retaining element are connected to a same expandable element.

9. The conveyor line according to claim 7, wherein the first retaining element and the second retaining element are connected to separate expandable elements that are spaced from each other.

10. The conveyor line according to claim 9, wherein the first retaining element and the second retaining element maintain the spacing between the first expandable element and the second expandable element.

11. A conveyor line comprising:
    at least a first stator element;
    at least a second stator element, the at least first and second stator elements being part of a stator of a long stator linear motor; and
    at least a holder comprising at least a first retaining element and at least a second retaining element, wherein the first retaining element and the second retaining element are arranged side by side and spaced apart from each other in a first direction, and the first retaining element comprises a first rigidity and the second retaining element comprises a second rigidity, which is lower than the first rigidity,
    wherein the first and the second stator element are arranged spaced apart from each other in the first direction,
    wherein the first stator element and the second stator element each comprise a first stator element end and a second stator element end, and
    wherein one of the first stator element ends is connected to the first retaining element of the holder and one of the second stator element ends is connected to the second retaining element of the holder.

12. The conveyor line according to claim 11, wherein the first stator element end of a stator element is attached to the first retaining element of holder and the second stator element end of the same stator element is attached to the second retaining element of holder.

13. The conveyor line according to claim 11, wherein the first stator element and the second stator element are directly adjacent.

14. The conveyor line according to claim 13, wherein the first stator element end of the second stator element is connected to the first retaining element of holder and the second stator element end of the first stator element is connected to the second retaining element of holder.

15. The conveyor line according to claim 11, wherein the holder comprises a U-shaped bridge having a base with two protruding arms and an inner area, and
    wherein at least one of the at least one first stator element and the at least one second stator element is arranged at least partially within the inner area.

16. The conveyor line according to claim 11, further comprises:
    a guide system to guide a transportation facility; and
    a mounting option formed as at least one of at least one holder bore and a clamping system on the first retaining element,
    wherein the mounting option is provided to attach the first retaining element to the guide system.

17. A holder comprising:
    at least a first retaining element having an element contact surface oriented in a contact direction and a holder bore at least opening into a surface opposite the contact surface; and
    at least a second retaining element having an element contact surface oriented in the contact direction,
    wherein the first retaining element and the second retaining element are arranged side by side and spaced apart from each other in a first direction, and
    wherein, in at least the first direction, the first retaining element comprises a first rigidity and the second retaining element comprises a second rigidity, which is lower than the first rigidity.

18. The holder according to claim 17, wherein the first retaining element and the second retaining element are connectable to a common contact surface of an expandable element.

19. The holder according to claim 17, wherein the first retaining element is connectable to a contact surface of a first expandable element and the second retaining element is connectable to a contact surface of a second expandable element.

20. The holder according to claim 19, wherein the first retaining element and the second retaining element maintain a spacing between the first expandable element and the second expandable element.

* * * * *